Patented Nov. 6, 1945

2,388,301

UNITED STATES PATENT OFFICE 2,388,301

PIGMENTED ALKYD RESIN

William A. Waldie, Dayton, Ohio, assignor to The Commonwealth Engineering Company of Ohio, Dayton, Ohio, a corporation of Ohio No Drawing. Application January 15, 1942, Serial No. 426,897

8 Claims. (Cl. 260—22)

This invention refers to pigmented alkyd resin and the method for its manufacture, and more particularly deals with resins characterized by the thorough and uniform dispersion of the pigment incorporated therein.

In the practice of my invention I first produce a pigmented gel in which the pigment is uniformly dispersed through a gelatinous body of fatty acids and then cause this pigmented gel to react with glycerin and phthalic acid or anhydride, or other suitable polybasic acid, to form a pigmented alkyd resin characterized by the fine dispersion and uniformity of its pigmentation.

In my copending application Serial No. 361,612, filed October 17, 1940 (granted May 19, 1942, as Patent No. 2,283,518), of which this is a continuation-in-part, I have broadly disclosed a method for the preparation of a pigment-oil paste product without grinding the pigment in the oil to disperse the particles. According to that method, the oil is first saponified and the pigment added thereto, and the mixture is then rendered slightly acid by the addition of a weak acid solution which causes precipitation of the pigment and fatty acid of the oil and the separation of water. The water including the glycerin resulting from the saponification of the oil is then decanted, or otherwise separated from the precipitate, and the pigmented precipitate is then reacted with glycerin to form the mono-, di-, or triglyceride of the fatty acid components of the saponified oil.

According to the present invention, I may employ the pigmented fatty acid resulting from the practice of the above described method in the preparation of the pigmented alkyd resin which is the subject matter of the present invention. This I may accomplish, for example, by causing the pigmented fatty acid to react with glycerine and phthalic anhydride under suitable time and temperature conditions to obtain a pigmented alkyd resin having the desired acid number, color, and other physical and chemical characteristics required.

In my copending application Serial No. 361,613, filed October 17, 1940 (granted May 19, 1942, as Patent No. 2,283,519), of which this application is also a continuation-in-part, I have further disclosed a method for the preparation of a pigmented gel according to which a drying oil fatty acid is saponified, pigment is added to the resulting soap, and the mixture is then acidified to precipitate a pigmented fatty acid mass. The water is decanted and the precipitate is reacted with glycerin to form the mono-, di-, or triglyceride of the fatty acid component of the oil originally used.

The intermediate and resulting products, it will be noted, possess the same physical and chemical characteristics as the corresponding products in the method claimed in my first mentioned copending application Serial No. 361,612, and the pigmented fatty acid obtained in the practice thereof may be used in like manner for the production of pigmented alkyd resins according to the method of my present invention.

Drying, semi-drying and non-drying oils and their fatty acids may be used in the preparation of the pigmented fatty acid gels employed in the practice of the invention which is the subject matter of this application. These terms are used in their commonly accepted scope; that is to say, oils such as tung, oiticica and perilla (iodine values over 130) are considered drying oils; oils such as sesame, cottonseed and sunflower seed (iodine values of 100–130) are considered as semi-drying oils; and oils such as peanut, coconut and castor (iodine values under 100) are considered as non-drying oils.

The pigments which may be used in producing the pigmented fatty acid gels which are subsequently reacted to form the pigmented alkyd resin of the present invention are those which do not react chemically with the materials employed in the production of the pigment gel and pigmented alkyd resin. Suitable pigments include lithopone, carbon black, titanium oxide, the chromium greens, ultramarine blue, kellow, red and black iron oxides etc. Lead and zinc pigments, for example, cannot be used in view of the fact that they are reactive. Zinc, for instance, reacts with tung oil acids.

By way of example and without thereby intending to limit my invention, I give the following typical procedures which may be followed in preparing pigmented alkyd resins according to my present invention.

*Example I*

| | | |
|---|---|---|
| Linseed oil | pounds | 22.00 |
| Lithopone | do | 40.00 |
| Caustic soda | do | 3.30 |
| Water | gallons | 30.00 |
| Glycerin | pounds | 11.75 |
| Acetic anhydride | do | 6.00 |
| Phthalic anhydride | do | 23.50 |

The linseed oil is saponified by adding the caustic soda in water solution using about two-thirds of the quantity of water above indicated. The mixture of oil and caustic solution is boiled for time sufficient completely to saponify the oil. Fifteen to thirty minutes is generally sufficient. Thereafter the lithopone is added as a water suspension using the remaining portion of water, and the batch is boiled for approximately one hour. To the resulting reaction mixture there is added the acetic anhydride, which makes the batch slightly acid to litmus. This causes precipitation of the pigment and oil fatty acids and the separation of water. The water is drained off or otherwise removed.

The glycerin and phthalic anhydride are heated slowly in a separate vessel to 400° F. and held at that temperature until a drop of the mixture on glass appears clear. The precipitate comprising pigmented fatty acid is then added to this mixture. This causes a sharp drop in temperature which is then brought back to approximately 450° F. and held there until the resulting pigmented resin has the required acid number.

The product of this procedure will be a pigmented alkyd resin characterized by the fine uniform dispersion of the pigment incorporated therewith.

Example II

| | | |
|---|---|---|
| Linseed oil | pounds | 22.00 |
| Carbon black | do | 5.50 |
| Caustic soda | do | 3.30 |
| Water | gallons | 75.00 |
| Glycerin | pounds | 11.75 |
| Phthalic anhydride | do | 23.50 |
| Acetic anhydride | do | 6.00 |

Example III

| | | |
|---|---|---|
| Cottonseed oil | pounds | 22.00 |
| Carbon black | do | 5.50 |
| Caustic soda | do | 3.30 |
| Water | gallons | 75.00 |
| Glycerin | pounds | 11.75 |
| Phthalic anhydride | do | 23.50 |
| Acetic anhydride | do | 6.00 |

Example IV

| | | |
|---|---|---|
| Soya bean oil | pounds | 22.00 |
| Lithopone | do | 40.00 |
| Caustic soda | do | 3.30 |
| Water | gallons | 30.00 |
| Glycerin | pounds | 11.75 |
| Acetic anhydride | do | 6.00 |
| Phthalic anhydride | do | 23.50 |

Example V

| | | |
|---|---|---|
| Linseed oil | pounds | 11.00 |
| Cottonseed oil | do | 11.00 |
| Titanium oxide | do | 40.00 |
| Caustic soda | do | 3.30 |
| Water | gallons | 30.00 |
| Glycerin | pounds | 11.75 |
| Acetic anhydride | do | 6.00 |
| Phthalic anhydride | do | 23.50 |

The procedure for producing pigmented alkyd resin from the components set forth in Examples II, III, IV and V is substantially the same as that hereinbefore set forth with respect to the components given in Example I and need not be repeated.

The foregoing examples are based on the use of vegetable oils and mixtures thereof, but, as has been mentioned hereinbefore, the fatty acids may be used with equal satisfaction as set forth in the following examples.

Example VI

| | | |
|---|---|---|
| Linseed oil fatty acids | pounds | 20.00 |
| Lithopone | do | 40.00 |
| Caustic soda | do | 3.25 |
| Water | gallons | 30.00 |
| Glycerin | pounds | 11.75 |
| Phthalic anhydride | do | 23.50 |
| Acetic anhydride | do | 5.50 |

Example VII

| | | |
|---|---|---|
| Linseed oil fatty acids | pounds | 20.00 |
| Titanium oxide | do | 40.00 |
| Caustic soda | do | 3.25 |
| Water | gallons | 30.00 |
| Glycerin | pounds | 11.75 |
| Phthalic anhydride | do | 23.50 |
| Acetic anhydride | do | 5.50 |

Example VIII

| | | |
|---|---|---|
| Tung oil fatty acids | pounds | 10.00 |
| Linseed oil fatty acids | do | 10.00 |
| Carbon black | do | 5.50 |
| Caustic soda | do | 3.25 |
| Water | gallons | 75.00 |
| Phthalic anhydride | pounds | 23.50 |
| Glycerin | do | 11.75 |
| Acetic anhydride | do | 5.50 |

Example IX

| | | |
|---|---|---|
| Linseed oil fatty acids | pounds | 20.00 |
| Lamp black | do | 5.50 |
| Caustic soda | do | 3.25 |
| Water | gallons | 75.00 |
| Glycerin | pounds | 11.75 |
| Phthalic anhydride | do | 23.50 |
| Acetic anhydride | do | 5.50 |

Example X

| | | |
|---|---|---|
| Soya bean oil fatty acids | pounds | 10.00 |
| Cottonseed oil fatty acids | do | 10.00 |
| Lamp black | do | 5.50 |
| Caustic soda | do | 3.25 |
| Water | gallons | 50.00 |
| Glycerin | pounds | 11.75 |
| Phthalic anhydride | do | 23.50 |
| Acetic anhydride | do | 5.50 |

The procedure followed in preparing pigmented alkyd resins from the components set forth in Examples VI to X is substantially the same as the procedure followed in Example I. The only actual difference (aside from relative proportions and the nature of the pigment) resides in the fact that in Examples I to V an oil, or mixture of oils, was used, while in Examples VI to X the fatty acids of an oil, or of a mixture of oils, were used.

While in the foregoing examples phthalic anhydride has been used, it will be understood that phthalic acid as well as maleic acid, maleic anhydride and other polybasic acids and their anhydrides may be used in the practice of my invention depending on the nature of the resin desired.

Likewise, while acetic anhydride has been used as the acidifying agent to precipitate the fatty acids and pigment from the saponified mass, it will be understood by those skilled in the art that any other suitable dilute inorganic or organic acid may be employed such as, for example, 1/10 N hydrochloric acid.

It will be further understood that while caustic soda has been used in the examples, any other saponifying agent producing soluble soap may be employed in place thereof, and that other polyhydric alcohols may be used in place of glycerin.

The essential step in the process of preparing the pigmented fatty acid gel which brings about the unexpectedly high dispersion of pigment without the use of milling or grinding of the pigment in the vehicle is the formation of a soap or equivalent pigment-oil or pigment-fatty acid wetting agent which functions to assist in dispersing the pigment particles throughout the fatty acid vehicle, which is thereafter caused to react with the polyhydric alcohol and polybasic acid to form the pigmented alkyd resin of my invention.

It will be understood that mixtures of pigment, as well as mixtures of different oils and mixtures of different fatty acids and of fatty acids and oils, may be used in the practice of my invention.

It will be understood that while I have described certain specific embodiments of my invention, it is not my intention to have it limited to the specific details of procedure and proportions herein set forth in view of the fact that my invention may be modified according to individual preference and conditions without departing from the spirit and scope of this invention as defined in the appended claims.

I claim:

1. The method of making pigmented alkyd resin which comprises reacting fatty oil with an alkali to form a soluble soap, mixing a pigment, non-reactive with the materials employed in the production of the pigmented gel and pigmented alkyd resins in the form of an aqueous suspension into said soap thoroughly to coat the particles of pigment therewith, acidifying the mixture to precipitate a pigmented fatty acid gel, said fatty acids in status nascendi uniformly coating said pigment removing the water which separates out, adding the fatty acid coated pigment to the heat reaction product of a polyhydric alcohol and polycarboxylic acid and heating to approximately 450° F. to react the fatty acid with the reaction product.

2. The method of making pigmented alkyd resin which comprises reacting vegetable oil with an alkali to form a soluble soap, mixing a pigment non-reactive with the materials employed in the production of the pigmented gel and pigmented alkyd resins in the form of an aqueous suspension into said soap thoroughly to coat the particles of pigment therewith, acidifying the mixture to precipitate a pigmented fatty acid gel, said fatty acid in status nascendi uniformly coating said pigment, removing the water which separates out, adding the pigment coated with vegetable oil fatty acid to the heat reaction product of a polyhydric alcohol and polycarboxylic acid, and heating to approximately 450° F. to react the fatty acid with the reaction product.

3. The method of making pigmented alkyd resin which comprises reacting a mixture of vegetable oils with an alkali to form a soluble soap, mixing a pigment non-reactive with the materials employed in the production of the pigmented gel and pigmented alkyd resins in the form of an aqueous suspension into said soap thoroughly to coat the particles of pigment therewith, acidifying the mixture to precipitate a pigmented fatty acid gel, said fatty acids in status nascendi uniformly coating said pigment, removing the water which separates out, adding the pigment coated with vegetable oils fatty acids to the heat reaction product of a polyhydric alcohol and polycarboxylic acid, and heating to approximately 450° F. to react the fatty acid with the reaction product.

4. The method of making pigmented alkyd resin which comprises reacting fatty oil with an alkali to form a soluble soap, mixing a pigment non-reactive with the materials employed in the production of the pigmented gel and pigmented alkyd resins in the form of an aqueous suspension into said soap thoroughly to coat the particles of pigment therewith, acidifying the mixture to precipitate a pigmented fatty acid gel, said fatty acids in status nascendi uniformly coating said pigment, removing the water which separates out, adding the fatty acid coated pigment to the heat reaction product of glycerin and phthalic anhydride, and heating to approximately 450° F. to react the fatty acid with the reaction product.

5. The method of making pigmented alkyd resin which comprises reacting non-drying oil with an alkali to form a soluble soap, mixing a pigment non-reactive with the materials employed in the production of the pigmented gel and pigmented alkyd resin in the form of an aqueous suspension into said soap thoroughly to coat the particles of pigment therewith, acidifying the mixture to precipitate a pigmented fatty acid gel, said fatty acids in status nascendi uniformly coating said pigment, removing the water which separates out, adding the pigment coated with non-drying oil fatty acid to the heat reaction product of a polyhydric alcohol and polycarboxylic acid, and heating to approximately 450° F. to react the fatty acid with the reaction product.

6. The method of making pigmented alkyd resin which comprises reacting non-drying oil with an alkali to form a soluble soap, mixing a pigment non-reactive with the materials employed in the production of the pigmented gel and pigmented alkyd resin in the form of an aqueous suspension into said soap thoroughly to coat the particles of pigment therewith, acidifying the mixture to precipitate a pigmented fatty acid gel, said fatty acids in status nascendi uniformly coating said pigment, removing the water which separates out, adding the pigment coated with non-drying oil fatty acid to the heat reaction product of glycerine and phthalic anhydride, and heating to approximately 450° F. to react the fatty acid with the reaction product.

7. The method of making pigmented alkyd resin which comprises reacting non-drying oil fatty acid with an alkali to form a soluble soap, mixing a pigment non-reactive with the materials employed in the production of the pigmented gel and pigmented alkyd resin in the form of an aqueous suspension into said soap thoroughly to coat the particles of pigment therewith, acidifying the mixture to precipitate a pigmented fatty acid gel, said fatty in status nascendi uniformly coating said pigment, removing the water which separates out, adding the pigment coated with non-drying oil fatty acid to the heat reaction product of polyhydric alcohol and polycarboxylic acid, and heating to approximately 450° F. to react the fatty acid with the reaction product.

8. The method of making pigmented alkyd resin which comprises reacting non-drying oil fatty acid with an alkali to form a soluble soap, mixing a pigment non-reactive with the materials employed in the production of the pigmented gel and pigmented alkyd resin in the form of an aqueous suspension into said soap thoroughly to coat the particles of pigment therewith, acidifying the mixture to precipitate a pigmented fatty acid gel, said fatty acid in status nascendi uniformly coating said pigment, removing the water which separates out, adding the pigment coated with non-drying oil fatty acid to the heat reaction product of glycerine and phthalic anhydride, and heating to approximately 450° F. to react the fatty acid with the reaction product.

WILLIAM A. WALDIE.